United States Patent [19]
Follett

[11] Patent Number: 5,440,550
[45] Date of Patent: Aug. 8, 1995

[54] HIGH SPEED SWITCHING ARCHITECTURE

[75] Inventor: Douglas Follett, Carlingford, Australia

[73] Assignee: Telstra Corporation Limited, Sydney, Australia

[21] Appl. No.: 150,076

[22] PCT Filed: Jul. 1, 1992

[86] PCT No.: PCT/AU92/00322

§ 371 Date: Nov. 18, 1993

§ 102(e) Date: Nov. 18, 1993

[87] PCT Pub. No.: WO93/01669

PCT Pub. Date: Jan. 21, 1993

[30] Foreign Application Priority Data

Jul. 1, 1991 [AU] Australia ............... PK6968

[51] Int. Cl.6 ................ H04L 12/56
[52] U.S. Cl. ................ 370/60; 340/825.8
[58] Field of Search .......... 370/58.1, 58.3, 60, 370/60.1, 94.1; 340/825.8

[56] References Cited

U.S. PATENT DOCUMENTS

| | | | |
|---|---|---|---|
| 4,864,558 | 9/1989 | Imagawa et al. | 370/60 |
| 5,046,064 | 9/1991 | Suzuki et al. | 370/60 |
| 5,109,378 | 4/1992 | Proctor et al. | 370/58.1 |
| 5,303,232 | 4/1994 | Proctor et al. | 370/60 |
| 5,317,561 | 5/1994 | Fischer et al. | 370/60.1 |

FOREIGN PATENT DOCUMENTS

| | | |
|---|---|---|
| 12628/88 | 9/1988 | Australia . |
| 26526/88 | 6/1989 | Australia . |
| 471380 | 2/1992 | European Pat. Off. . |

*Primary Examiner*—Benedict V. Safourek
*Attorney, Agent, or Firm*—Baker & Daniels

[57] ABSTRACT

The present invention provides a high speed non-blocking buffered banyan packet switching architecture which utilizes parallel switching fabrics to switch slices of serial packets (subpackets) in a parallel manner. Serial digital information is received, converted into parallel form, buffered, and introduced into a parallel interconnect network which provides separate parallel paths for each packet/subpacket of information. The parallel subpackets are multiplexed, switched, demultiplexed, and recombined by way of a parallel-to-serial converter and an output port controller so as to reconstitute the original serial data stream, thereby providing high speed effective data switching at relatively low clock speeds.

6 Claims, 6 Drawing Sheets

HIGH SPEED SWITCHING ARCHITECTURE

TECHNICAL FIELD

The present invention relates to a high speed switching architecture, particularly for ATM or fast packet switches.

BACKGROUND ART

The banyan-based architectures are one type of space division packet switching. However, while the banyan-based switches have less crosspoints than other techniques, they do require a means of overcoming blocking, improving throughput and reducing cell loss. This is because of the contention that occurs at a crosspoint when two (or more) inputs want to access the same outlet. These 'means' therefore further classify the banyan-based switches into either buffered-banyan or batcher-banyan architectures. The buffered banyan architectures have buffers at the points of contention while the batcher-banyan architectures minimise the contention by sorting the input cells. The buffered banyan architecture has been adopted to realise a switching fabric subsystem. However, these generally involved several levels of buffers at the input, output and intermediate switching stages.

DISCLOSURE OF INVENTION

It is an object of the present invention to provide an architecture which improves the throughput of and minimises the delay through the switching fabric by a packet or ATM cell.

This is achieved by providing a manyfold parallel path internal switch architecture, which requires minimal buffering and multiplexing. According to one aspect the present invention comprises a packet switch, comprising a switching fabric unit (SFU) having a plurality of inputs and a plurality of outputs, each input and output having a respective port controller means, wherein said input port controller means are adapted to convert each input serial packet into a plurality of parallel packets, said SFU including internal parallel paths for each of said plurality of packets, and said output port controller means including means for converting said parallel packets into a serial packet form as input.

The invention will be described with reference to a 16×16 switching architecture, i.e., an architecture for switching input ATM cells from 16 inputs and switching to any one of 16 outputs. However, it will be appreciated that the inventive concept is equally applicable to other n×n switches.

DETAILED DESCRIPTION

Figure 1:
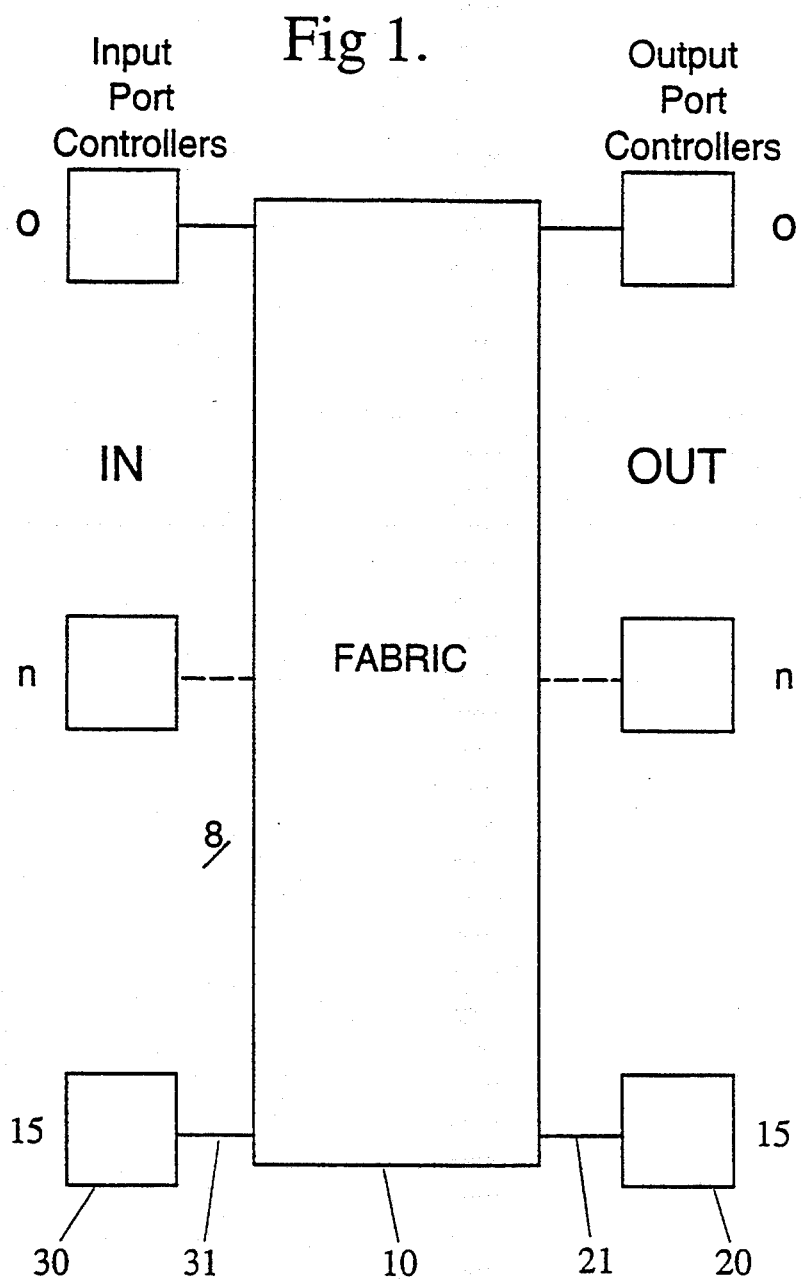
FIG. 1 is a schematic view of one embodiment of a switch according to the present invention.

Referring to FIG. 1, a schematic block diagram conceptually illustrates a switch 10 comprising a switching fabric with inputs 0–15 and outputs 0–15, i.e. a 16×16 switching fabric. The switch also includes input port controllers $30_n$ on each input 0–15 and output port controllers $20_n$ on each output 0–15. In a suitable construction input and output port controllers may be the same unit.

Figure 2:
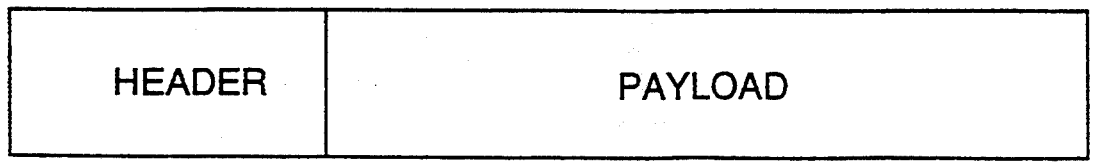
FIG. 2 is a conceptual view of a format of a packet.

Packets to be switched preferably arrive at the input port controller in the form of ATM frames. Referring to FIG. 2, an ATM frame according to an embodiment of the invention comprises a header of at least 3 bytes, and an ATM cell as defined by CCITT recommendation I.361 comprising 53 bytes as payload.

Input port controllers $30_n$ convert incoming serial ATM frames into an 8 bit wide data stream. The serial ATM frames are converted to parallel packets by sequentially placing received bits onto each parallel link. The output port controllers $20_n$ perform the reverse operation.

It will therefore be appreciated that links $21_n$, $31_n$ between the SFU and output and input port controllers are in fact each 8-fold parallel connections.

Figure 6:
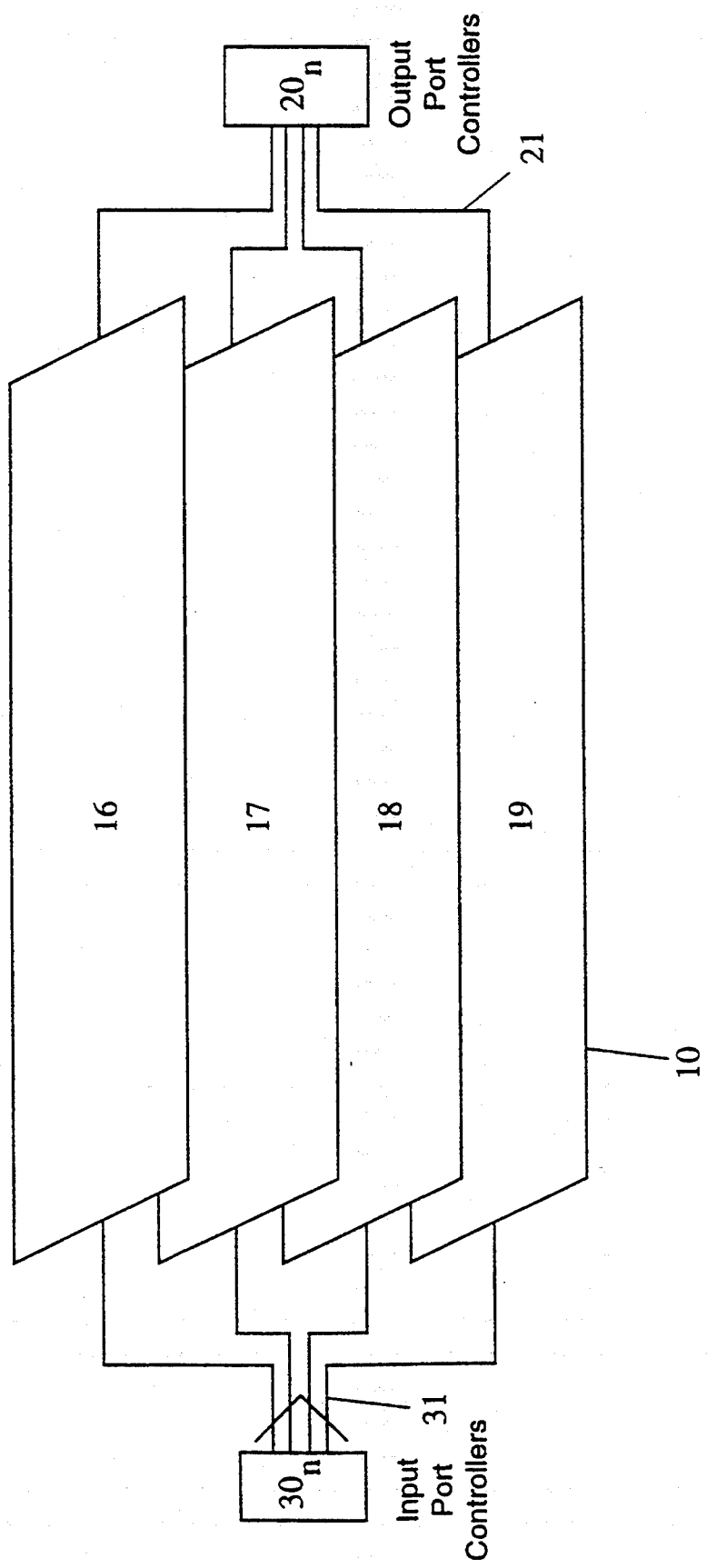
FIG. 6 illustrates the multi-plane switch architecture.

The switching fabric 10 according to the present invention comprises four parallel planes, each plane being a 16×16 switching fabric sub-unit 16, 17, 18, 19, as can be seen in concept from FIG. 6. Thus, two bit wide slices of the 8-bit wide data stream are received by each 16×16 switching fabric sub-unit 16, 17, 18, 19, wherein the replicated address header for each respective plane is identical.

Figure 3:
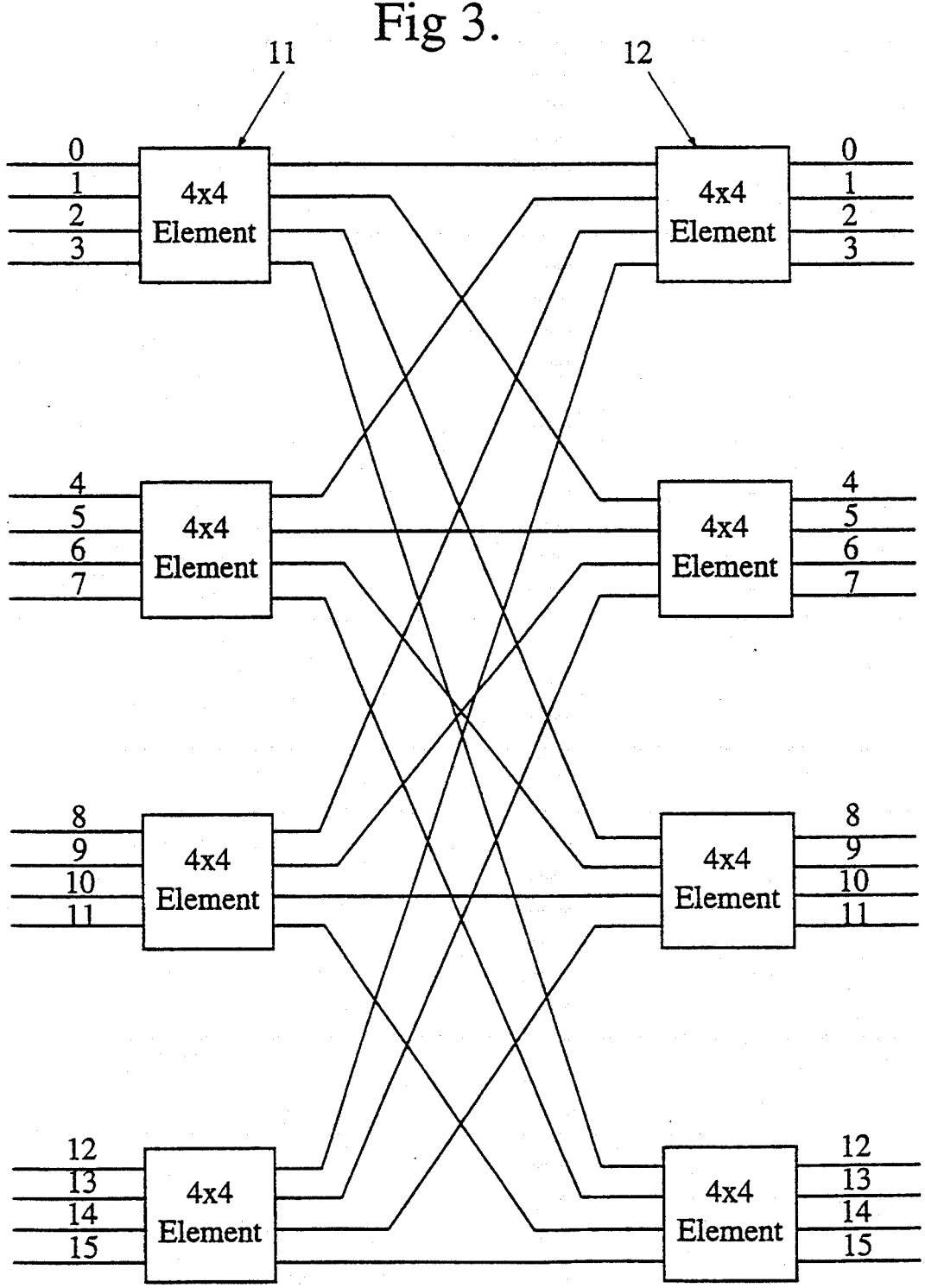
FIG. 3 is an illustration of a switching fabric unit architecture according to one embodiment of the invention.

A general architecture for a 16×16 switching fabric sub-unit constructed from 4×4 elements 11 and 12, is shown in FIG. 3. Other architectures at this level may be used within the scope of the invention, but this architecture will be used by way of example.

Figure 4:
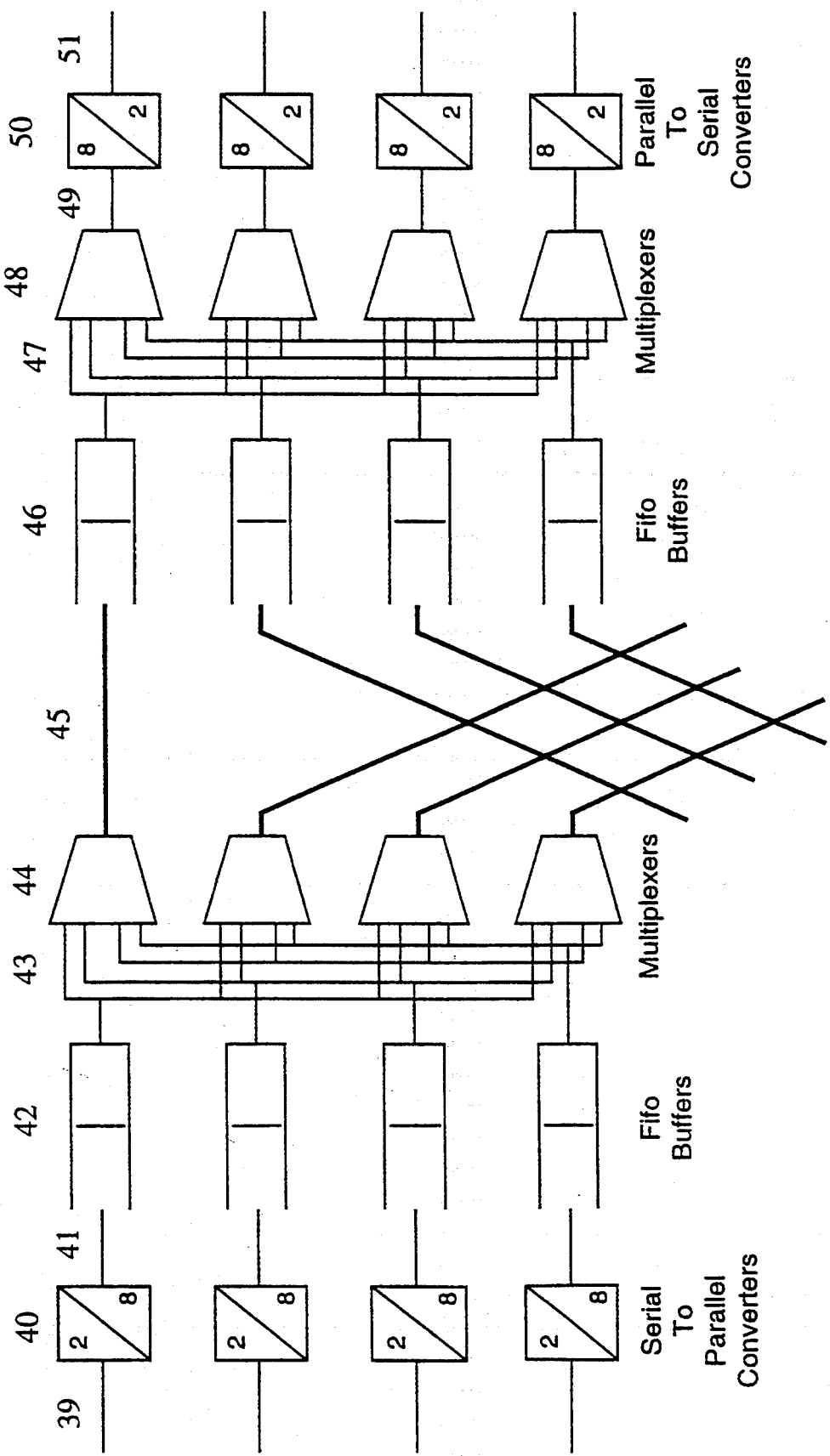
FIG. 4 illustrates schematically in part one switching fabric architecture.

FIG. 4 shows one embodiment of the invention in detail. This corresponds to two 4×4 elements 11 and 12 of a single plane of the switching fabric with interconnect as indicated.

Two bit wide inputs 39 are converted to an 8-bit wide data stream by serial to parallel converters 40, and enter 8-bit wide FIFO buffer 42. Interconnect network 43 provides separate parallel paths for each frame segment from buffer 42 to the addressed multiplexer 44.

Multiplexer 44 is effectively controlled by the routing headers on the cells, and routes the inputs via link 45 to input FIFO buffers 46 of the second switching stage. Again, interconnect network 47 provides separate parallel paths for each packet to the addressed one of multiplexers 48. Parallel connection 49 connects to parallel to serial converters 50, which produce each a 2 bit wide output from 8 bit wide input 49, and hence output 51 comprises a 2 bit wide data for output to the respective output port controller.

It will be appreciated that the various slices from all the planes will be recombined at the output port controller to reconstitute the original serial data stream.

Figure 5:
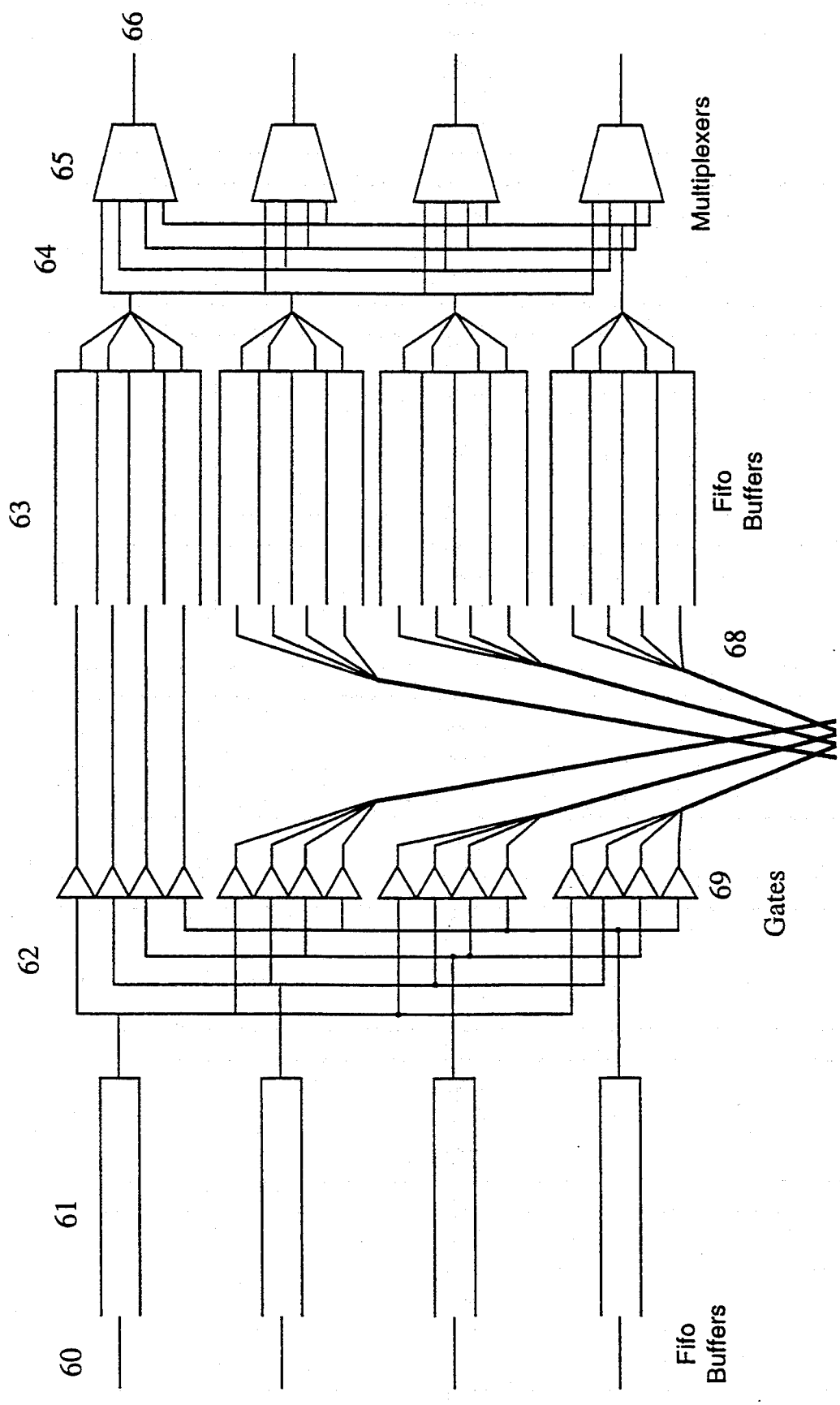
FIG. 5 illustrates schematically a preferred switching fabric architecture.

A preferred embodiment is shown in FIG. 5, showing two 4×4 elements of a single plane.

The input 60 from input port controller $30_0$, is a 2 bit wide slice presented to FIFO buffers 61. Once the packets reach the output of buffers 61, they are sent via parallel interconnect network 62 and gating means 69 to FIFO buffers 63 of the second stage. It should be appreciated that gating means 69 are effectively controlled by the routing headers on the cells, and if required gating means may involve more elaborate multiplexing. Once the packets are clocked to the end of buffers 63 and multiplexers 65 are available, the packets are sent via parallel interconnect network 64 to multiplexers 65 and then via output 66 to the respective output port controller.

It will be appreciated that in this embodiment, no further serial to parallel conversion is introduced beyond the port controller stage. Instead internal parallel paths alone are used to provide a non-blocking capability and improved throughput.

It will be appreciated that the configuration of FIG. 5 represents an improvement in throughput as compared with a basic buffered-banyan architecture. Using the preferred embodiment of the present invention throughput limits at approximately 70% of offered load. Results previously published for a 16×16 single buffered-banyan network with 2×2 switching elements show limiting at about 52% (Jenq YC, "Performance Analysis of a Packet Switch based on Single-Buffered-Banyan Network", IEEE Journal of Selected Areas is Communications Vol SAC-1 No. 6 December 1983 pp 1014–1021).

Implementation

The following discussion relates to one implementation of the invention and is not to be taken as limitative of the general scope of the invention.

This implementation uses 1μ CMOS standard cell technology, principally because of availability—custom ASICS would probably result in a more optimum arrangement.

The design chosen uses dual port RAM for the FIFO buffers to reduce chip area and power dissipation.

The implementation uses 4 switching Fabric Chips (SFC) operating in parallel as discussed previously. Each SFC switches 2 bits, i.e. one quarter of the byte which is input to port controller $30_n$. The data is clocked at about 20 MHz between the port controllers $30_n$ and SFU 10.

It is important to note that packets from all ports are aligned in time, and that progress through each parallel SFC is aligned, so as that at the output the fragments of each packet may be reliably reassembled.

To provide control and timing to internal circuits within each SFC, a 20 MHz 2-phase clock with 90° phase shift is required. This is particularly required for the dual port RAM selected. Preferably, clock skew across the entire switch is less than 5 nanoseconds.

In order to maximise throughput, the SFC architecture should be optimised as much as possible. The key parameters for maximising throughput have been identified as:
 buffer sizes and distribution
 increasing internal transfer rate
 simultaneous read from and write into buffers
 cut-through capability.

The implementation shown in FIG. 5 has a number of advantages, including:
 avoids serial to parallel and parallel to serial conversion
 allows for read in and write out simultaneously from buffers (thereby reducing buffer size)
 simplified control circuitry
 simplifies cut-through implementation.

Each inlet 60 has a FIFO buffer 61 with a depth of 1 packet (i.e. 64 addressable locations) and a width of 2 bits. Each second stage element, however, has 16 FIFO buffers 63 each 1 packet deep. Hence, in the second stage there are a total of 64 FIFOs (allowing for the other 4×4 elements) and so the internal data transfer rate is effectively 160 Mbps. Stage 1 merely requires selection of the correct stage 2 buffer 63.

Figure 7:
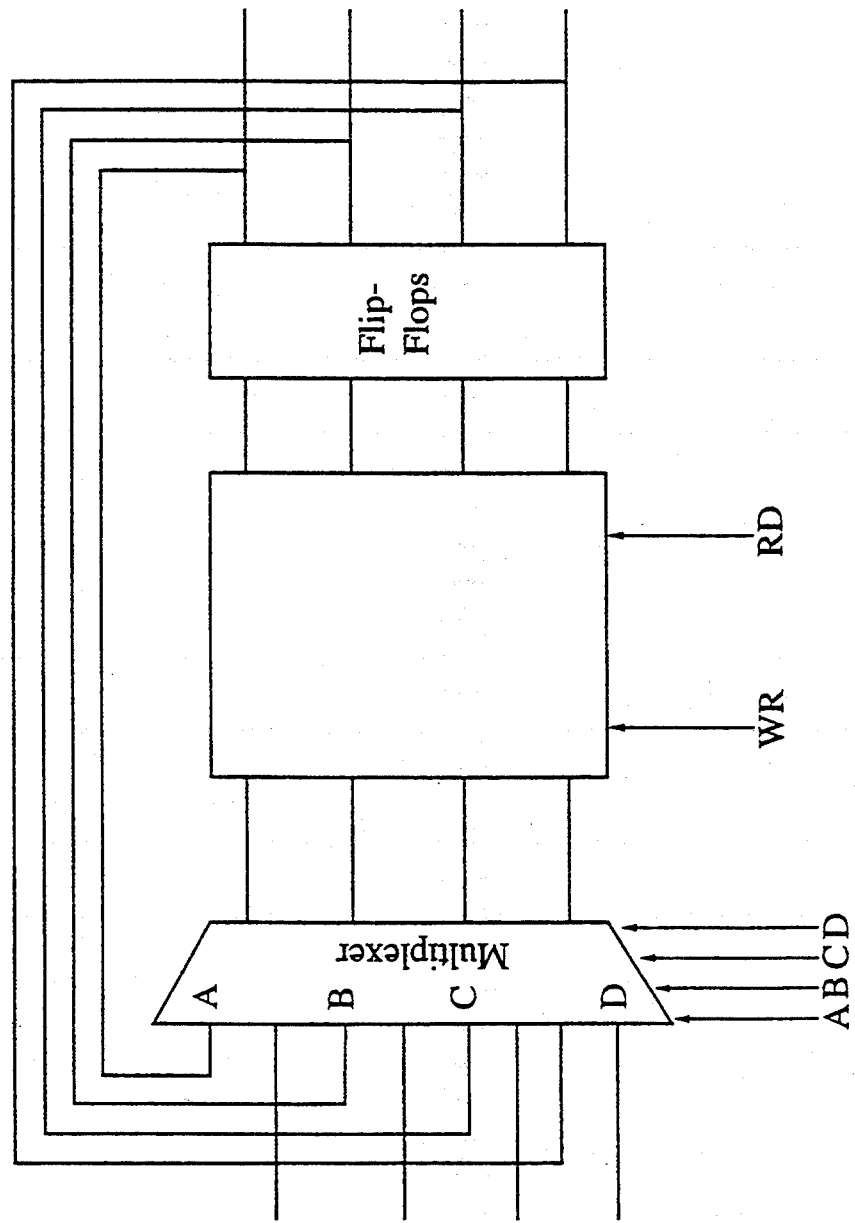
FIG. 7 illustrates the FIFO buffer architecture.

In the implementation chosen, the 80 FIFO (16 stage 1+64 stage 2) buffers are implemented as a dual-port RAM operating as a FIFO with packets stored in parallel. This allows for a vastly reduced area requirement on the chip. A schematic illustration is shown as FIG. 7, for four FIFO buffers.

The RAM block is dual port to permit simultaneous read and write as in a FIFO. Since the buffers are combined in a block they have common address, read and write lines. Each of the four FIFO buffers in this RAM block however, operate as separate buffers. Since packets entering the SFC are synchronised the address can be identical for each buffer. But each buffer must have its own control for either reading the last packet and writing a new packet or storing the last packet. This is achieved with the multiplexers at the RAM write port which selects either data already in the RAM or new data.

The differences between stages 1 and 2 arise because of the fourfold increase in parallel interconnection paths between them. From FIG. 5, it can be seen that stage 1 has 4 buffers, associated requester control and 16 output paths which are arranged in 4 groups of 4. The second stage therefore, has 16 buffers arranged in parallel. The 4 outputs have access to each of the 16 buffers under the control of the granter associated with each output.

The RAM buffer block differ slightly. Stage 1 delays the input before writing the packet into the main block of RAM, whereas stage 2 delays the data already stored in RAM. This occurs because of the requirement to have the input and output packets from the SFC aligned.

The maximum frequency of operation is to be 25 MHz. Thus, the time allowed for propagation delay and set-up time etc. is 40 nanoseconds. Under worst case conditions of temperature and process variations a factor of 1.69 is used to calculate the maximum typical delay allowed for correct device operation. This equates to 23.67 nanoseconds. The design is to follow sunchronous design rules which means that flip flops are only clocked by the master clock. This simplifies the realisation process to basically 3 constraints:
 1. the minimisation of clock skew over the chip, and
 2. keeping the propagation delay through combinational logic etc. between 2 flip flop or latches to less than 22 nanoseconds. (Allowance must also be made for set-up times, clock skew etc.)
 3. keeping the propagation delay through combinational logic etc. between a flip flop and RAM write port to less than 17 nanoseconds. (Allowance must also be made for set-up times, clock skew etc.).

Further improvements in throughput can be achieved with variations in the architectures but which still are within the scope of the invention.

It will be appreciated that the preferred embodiment is adapted to allow easy implementation using integrated circuit techniques. Further, the inventive concept is applicable to other n×n switches, using other sub-elements than 4×4 e.g. 2×2 if desired. Variations and additions within the spirit and scope of the invention will be apparent to the skilled addressee and are incorporated within this application.

What is claimed is:

1. A multistage space division packet switch, comprising a switching fabric unit SFU having a plurality of inputs and a plurality of outputs, each input having an input port controller means and each output having an output port controller means, wherein said input port controller means are adapted to convert each input serial packet into a plurality of parallel subpackets, said SFU including internal parallel switching planes, each of said parallel switching planes comprising a first stage including a first buffer means, a parallel interconnect network, and a second stage comprising at least one buffer means associated with each of a plurality of addressable outputs, and said output port controller means including means for converting said parallel subpackets into a serial packet form for output.

2. A packet switch according to claim 1, wherein said packets are self addressing.

3. A packet switch according to claim 1, wherein said internal planes are synchronized such that said parallel subpackets arrive in the correct order at said output port controller means.

4. A packet switch according to claim 3, wherein said packets are self addressing.

5. A packet switch comprising a plurality of packet switches according to claim 1.

6. A method of packet switching, in a system comprising a switching fabric unit SFU having a plurality of inputs and a plurality of outputs, each input having an input port controller means and each output having an output port controller means, comprising the steps of:

converting each input serial packet into a plurality of parallel subpackets at said input port controller means;

inputting each of said plurality of parallel subpackets to one of a set of parallel switching planes in said SFU;

switching each of said plurality of parallel subpackets over a set of internal parallel paths within said plane;

outputting from said SFU said plurality of parallel subpackets; and reassembling each serial packet from said plurality of parallel subpackets at said output port controller means.

* * * * *